United States Patent
Gary et al.

(10) Patent No.: US 11,491,437 B2
(45) Date of Patent: Nov. 8, 2022

(54) METHOD FOR THE CONTINUOUS PRODUCTION OF A GASEOUS HYDROGEN STREAM

(71) Applicant: L'Air Liquide, Société Anonyme pour l'Etude et l'Exploitation des Procédés Georges Claude, Paris (FR)

(72) Inventors: Daniel Gary, Montigny le Bretonneux (FR); Laurent Allidieres, Saint Martin d'Uriage (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 286 days.

(21) Appl. No.: 16/636,095

(22) PCT Filed: Jul. 13, 2018

(86) PCT No.: PCT/FR2018/051786
§ 371 (c)(1),
(2) Date: Feb. 3, 2020

(87) PCT Pub. No.: WO2019/025690
PCT Pub. Date: Feb. 7, 2019

(65) Prior Publication Data
US 2021/0162334 A1    Jun. 3, 2021

(30) Foreign Application Priority Data

Aug. 3, 2017    (FR) ........................................ 1757491

(51) Int. Cl.
*B01D 53/02* (2006.01)
*B01D 53/047* (2006.01)
(Continued)

(52) U.S. Cl.
CPC ....... *B01D 53/047* (2013.01); *B01D 53/0462* (2013.01); *C01B 3/56* (2013.01);
(Continued)

(58) Field of Classification Search
CPC ........ B01D 2253/102; B01D 2253/104; B01D 2253/1112; B01D 2256/16;
(Continued)

(56) References Cited

U.S. PATENT DOCUMENTS 4,865,826 A * 9/1989 Carnell ..................... C07C 7/13
                                                   502/56
5,012,037 A * 4/1991 Doshi ....................... C07C 7/12
                                                   95/143
(Continued)

FOREIGN PATENT DOCUMENTS

| CN | 104519977 | 4/2015 |
|---|---|---|
| EP | 1 097 902 | 5/2001 |

(Continued)

OTHER PUBLICATIONS

International Search Report and Written Opinion for corresponding PCT/FR2018/051786, dated Jan. 10, 2019.

*Primary Examiner* — Christopher P Jones
(74) *Attorney, Agent, or Firm* — Elwood L. Haynes

(57) ABSTRACT

A process for the production of a hydrogen gas stream having a CO content of less than 1 ppm having a production cycle comprising two phases: phase 1 includes a) purifying a synthesis gas in a PSA unit, b) recovering a hydrogen gas stream comprising a CO content of greater than 1 ppm, c) purifying the gas stream by adsorption in a TSA unit, and recovery a hydrogen gas stream exhibiting a CO content of less than 1 ppm, and phase 2 includes e) purifying the synthesis gas in a PSA unit, f) recovering a hydrogen gas stream having a CO content of less than 1 ppm, where
(Continued)

throughout steps e) and f), the TSA unit is bypassed by the hydrogen gas stream and is regenerated.

10 Claims, 3 Drawing Sheets

(51) Int. Cl.
*B01D 53/04* (2006.01)
*C01B 3/56* (2006.01)

(52) U.S. Cl.
CPC .. *B01D 2253/102* (2013.01); *B01D 2253/104* (2013.01); *B01D 2253/1122* (2013.01); *B01D 2256/16* (2013.01); *B01D 2257/502* (2013.01); *C01B 2203/047* (2013.01); *C01B 2203/147* (2013.01)

(58) Field of Classification Search
CPC .......... B01D 2257/502; B01D 53/0462; B01D 53/047; C01B 2203/047; C01B 2203/147; C01B 3/56
See application file for complete search history.

(56) References Cited

U.S. PATENT DOCUMENTS

| | | |
|---|---|---|
| 5,914,455 A | 6/1999 | Jain et al. |
| 2002/0014153 A1 | 2/2002 | Baksh et al. |
| 2009/0223371 A1 | 9/2009 | Nakao et al. |
| 2010/0071551 A1 | 3/2010 | Monereau et al. |
| 2011/0017061 A1* | 1/2011 | Carlsson ............ B01D 53/0462 95/122 |
| 2015/0152030 A1* | 6/2015 | Trott ..................... C01B 3/56 518/704 |
| 2015/0158726 A1 | 6/2015 | Fuentes et al. |
| 2015/0175916 A1* | 6/2015 | Klein ..................... C01B 3/025 422/187 |
| 2019/0143258 A1* | 5/2019 | Meirav ............. B01D 53/0438 95/115 |
| 2021/0054419 A1* | 2/2021 | Fujimori ................ C12P 7/065 |

FOREIGN PATENT DOCUMENTS

| | | |
|---|---|---|
| EP | 1 826 177 | 8/2007 |
| EP | 3 181 517 | 6/2017 |
| FR | 2 991 192 | 12/2013 |
| JP | 2011 167629 | 9/2011 |
| WO | WO 2008 132377 | 11/2008 |

* cited by examiner

US 11,491,437 B2

METHOD FOR THE CONTINUOUS PRODUCTION OF A GASEOUS HYDROGEN STREAM

CROSS REFERENCE TO RELATED APPLICATIONS

This application is a 371 of International PCT Application No. PCT/FR2018/051786, filed Jul. 13, 2018, which claims priority to French Patent Application No. 1757491, filed Aug. 3, 2017, the entire contents of which are incorporated herein by reference.

BACKGROUND

The present invention relates to a process for the production, from synthesis gas, of a hydrogen gas stream exhibiting a CO content of less than 1 ppm.

The bulk production of hydrogen is conventionally carried out by the steam reforming of a carbon-based source, such as natural gas, which is rich in methane ("SMR process"). This process results in the formation of a synthesis gas predominantly rich in $H_2$ and in CO. In order to obtain hydrogen, the synthesis gas will be post-treated, for example by purification processes, indeed even distillation processes.

Several solutions are provided, depending on the degree of purity required and on the production cost targeted.

The production of ultrapure $H_2$ can be obtained by cryogenic distillation of a mixture rich in $H_2$/CO. Prior to the distillation phase, the synthesis gas produced should be decarbonated and dehydrated. This technique is advantageous when it is desired to produce the two molecules $H_2$ and CO at the same time. The residue gas rich in $H_2$ originating from a cold box for the cryogenic separation of CO contains approximately 97%.

This same $H_2$/CO mixture (synthesis gas), originating directly from the steam reforming furnace or which has been subjected to one or more stages of reaction with water (water-gas shift reaction), can also be post-treated by passage over a PSA (Pressure Swing Adsorption) but, in this case, due to the limits of the PSA and in order not to excessively penalize its output, the final product can contain impurities of $N_2$ or CO type at the level of a few ppm to several tens or hundreds of ppm.

For certain industrial applications (for example the feeding of a fuel cell), the critical molecule proves to be CO, which is a poison for the fuel cell if its concentration is greater than 200 ppb. There is a risk, in the future, of this value falling to 100 ppb in order to allow fuel cell technologies which are poorer in expensive (platinum type) catalyst.

One technique for purifying hydrogen comprising between 0.5 and 100 ppm of CO down to 100 ppb consists in passing the gas stream into an adsorbent (active carbon or molecular sieve) at very low temperature, typically that of liquid nitrogen. The disadvantage of this technique lies mainly in the cost of the equipment (pressurized cryogenic tanks, heat exchangers, LN2 cryostats) and also the operating costs (LN2).

Another purification technique consists in passing the hydrogen through a palladium-covered metal membrane. As a result of the cost of palladium, this technique is also expensive. Furthermore, the hydrogen is recovered at low pressure as a result of the loss of head in the membrane.

Starting from this, a problem which is posed is that of providing an improved process for the production of a hydrogen stream devoid of carbon monoxide, without, however, resorting to cryogenic adsorption or metal membranes.

SUMMARY

A process for the production of a hydrogen gas stream having a CO content of less than 1 ppm having a production cycle comprising two phases: phase 1 includes a) purifying a synthesis gas in a PSA unit, b) recovering a hydrogen gas stream comprising a CO content of greater than 1 ppm, c) purifying the gas stream by adsorption in a TSA unit, and recovery a hydrogen gas stream exhibiting a CO content of less than 1 ppm, and phase 2 includes e) purifying the synthesis gas in a PSA unit, f) recovering a hydrogen gas stream having a CO content of less than 1 ppm, where throughout steps e) and f), the TSA unit is bypassed by the hydrogen gas stream and is regenerated.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DETAILED DESCRIPTION OF PREFERRED EMBODIMENTS

Figure 1:
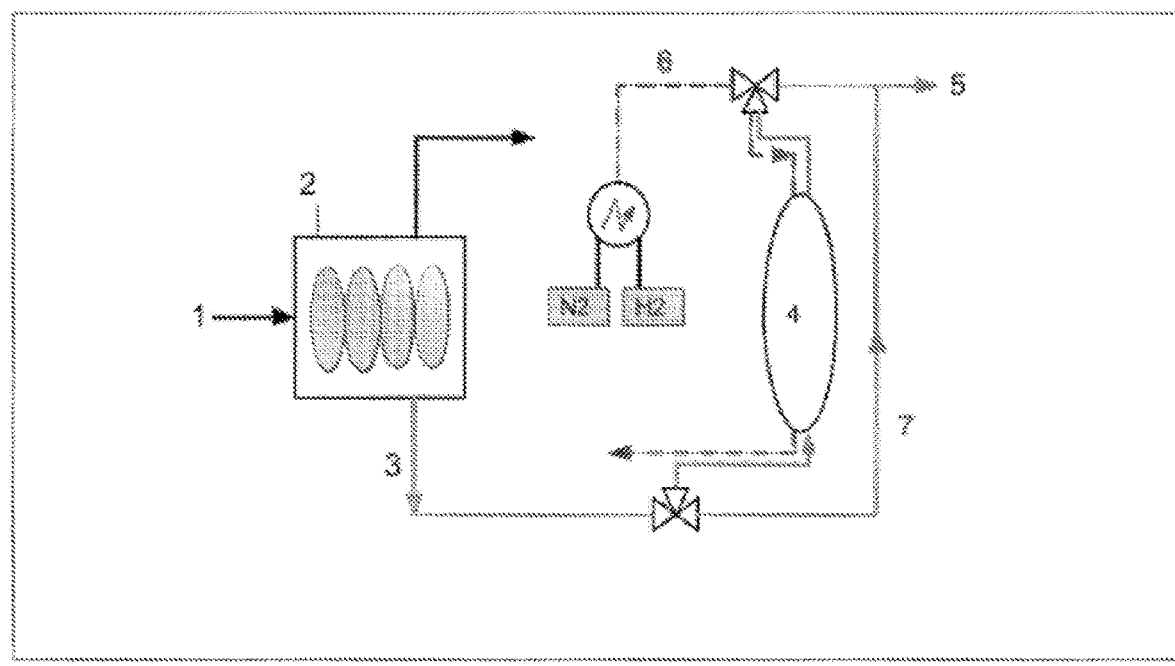
FIG. 1 illustrates a schematic representation in accordance with one embodiment of the present invention.

As illustrated in FIG. 1, one solution of the present invention is a process for the production of a hydrogen gas stream 5 exhibiting a CO content of less than 1 ppm starting from synthesis gas 1, comprising a production cycle exhibiting two phases:
  a first phase comprising the following successive stages:
    a) a stage of purification of the synthesis gas 1 by adsorption by means of a unit of PSA type 2,
    b) a stage of recovery, at the outlet of the PSA unit, of a hydrogen gas stream 3 exhibiting a CO content of greater than 1 ppm,
    c) a stage of purification of the gas stream recovered in stage b) by adsorption by means of unit of TSA type 4 of chemisorber type, and
    d) a stage of recovery, at the outlet of the TSA unit, of a hydrogen gas stream 5 exhibiting a content of less than 1 ppm,
  a second phase comprising the following successive stages:
    e) a stage of purification of the synthesis gas 1 by adsorption by means of the unit of PSA type 2,
    f) a stage of recovery, at the outlet of the PSA unit, of a hydrogen gas stream 5 exhibiting a CO content of less than 1 ppm,
with, throughout stages e) and f), the TSA unit is bypassed 7 by the hydrogen gas stream and regenerated 6.

TSA is understood to mean Temperature Swing Adsorption processes.

In TSA processes, the adsorbent, at the end of use, is regenerated in situ, that is to say that the impurities captured are discharged in order for said adsorbent to recover the greater part of its adsorption capabilities and to be able to recommence a purification cycle, the essential regeneration effect being due to a rise in temperature.

In processes of PSA type, the adsorbent, at the end of the production phase, is regenerated by desorption of the impurities, which is obtained by means of a fall in their partial pressure. This fall in pressure can be obtained by a fall in the total pressure and/or by flushing with a gas devoid of or containing little in the way of impurities.

As the case may be, the process according to the invention can exhibit one or more of the following characteristics:
- during the second phase, the TSA unit is bypassed by means of a bypass line 7,
- the TSA unit comprises just one adsorber 4,
- the adsorber comprises an active material which will chemisorb at east a part of the CO,
- the active material comprises nickel and/or copper,
- the PSA unit 2 comprises at least two adsorbers which each follow, in staggered fashion, a pressure cycle comprising the adsorption, depressurization and repressurization stages,
- the pressure cycle carried out during the second phase exhibits a shorter duration than the duration of the pressure cycle carried out during the first phase,
- the pressure cycle during the first phase and the pressure cycle during the second phase exhibit an identical duration and the depressurization of the pressure cycle carried out during the second phase is carried out at a lower pressure than the pressure of the depressurization carried out during the first phase. Specifically, in this case, the pressure will be lowered by at least 50 mbar,
- the PSA unit comprises at least one adsorber comprising a layer of alumina, a layer of active carbon and a layer of molecular sieve,
- the duration of the first phase is greater than at least 10 times the duration of the second phase.

The present invention relates to the provision of ultrapure $H_2$, produced from a source of synthesis gas type or of gas very rich in $H_2$. This mixture rich in $H_2$ will be purified the majority of the time in 2 stages. The methodology provided combines two coupled subprocesses, namely:
- first subprocess: the feed hydrogen gas stream is introduced into a unit of PSA type comprising at least two adsorbers charged with different adsorbents distributed in layers and intended for the trapping of the impurities by physical adsorption. The PSA will operate in short cycles (a few minutes). The adsorbers of the PSA unit will follow, in staggered fashion, the following successive stages: adsorption at high pressure of the cycle, cocurrentwise decompression, countercurrentwise decompression, elution, countercurrentwise recompression, cocurrentwise recompression. Typically, the adsorbers of the PSA units can contain a layer of alumina for removing the water vapor, one or more layers of active carbon for removing certain molecules, such as $CO_2$, $CH_4$ and the majority of the CO and nitrogen, and one or more layers of molecular sieve for forcing the removal of the traces of CO and nitrogen. The hydrogen thus produced will have a purity >99.999%; the residual impurities will be minimal (ppm to a few tens of ppm). However, this hydrogen purity is not sufficient for its use in a fuel cell as a result of the presence of CO (content>ppm).
- second subprocess: the impure hydrogen exiting from the PSA is purified by passage through a TSA unit, which preferably comprises a single adsorber charged with an active material which will chemisorb the residual CO impurity. The TSA will operate in long cycles: a few days, indeed even a week, indeed even a month. The regeneration of the TSA will preferably be carried out under a temperature of greater than 150° C. The temperature of the regeneration stream (nitrogen, hydrogen or mixture) will be raised by means of a heating system (reheater). The duration of heating of the regeneration stream will be maintained up to the end of the regeneration cycle; at the end, the reheater will be halted, the reactor will be flushed and rinsed with pure hydrogen, then isolated under an $H_2$ atmosphere. The temperature of the TSA will return to ambient temperature by convective exchange with its environment, or by circulation of hydrogen at ambient temperature, or by circulation of liquid coolant in the reactor. Once at ambient temperature, the TSA will again be available and operational for a new purification cycle.

A hydrogen gas stream exhibiting a CO content of less than 1 ppm is recovered at the outlet of the TSA unit.

Throughout the duration of the regeneration of the TSA, the PSA is adjusted to "high purity": in other words, the output of the PSA is lowered and the production of hydrogen exhibiting a CO content of less than 1 ppm is rendered possible, either by reducing the time of the overall cycle or, preferably, by reducing the depressurization pressure.

Moreover, throughout the duration of the regeneration of the TSA, the hydrogen gas stream is no longer purified in two stages but in a single stage, and by means of the PSA unit. During this mode of operation, the TSA is then bypassed by means of the bypass line.

The solution according to the invention thus makes it possible to continuously produce a hydrogen gas stream exhibiting a CO content of less than 1 ppm while limiting the amount of adsorbers of the TSA unit and while optimizing the output of the upstream PSA, which only experiences a decline in its output in "high purity" mode for a few hours per day, weeks, indeed even months.

Tests have shown the possibility of purifying, to a CO content of less than 0.1 ppm, a hydrogen stream contaminated by CO present in the form of traces (20-100 ppm). This purification by TSA is carried out at ambient temperature and at the pressure delivered by the upstream PSA (typically in the range 15-35 atmospheres). The monitoring and the effectiveness of the TSA purification are produced by means of a commercial analyser of FTIR (Fourier Transform InfraRed spectroscopy) type, the detection level for CO of which is < than 100 ppb. The TSA purification continues at least until the appearance (the breakthrough) of traces of CO at the adsorber outlet. The purification can continue beyond in order to obtain the breakthrough curve of the CO as a function of the purification time.

Figure 2:
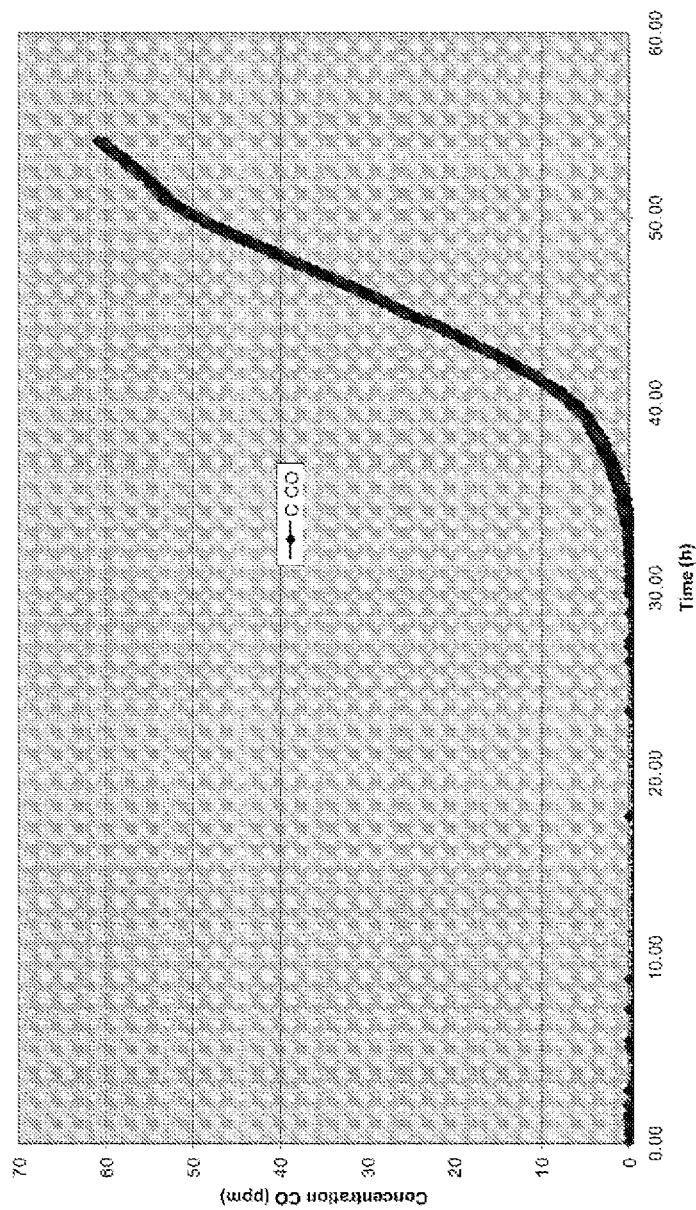
FIG. 2 illustrates the results of a TSA test fed with impure hydrogen in accordance with one embodiment of the present invention.

FIG. 2 illustrates the results of a TSA test fed with impure hydrogen (contaminated with 95 ppm of CO). The ultrapurification (<0.1 ppm) is maintained for 30 hours or more; beyond, the CO breaks through. The adsorption capacity of the desired chemisorbing material can thus be calculated by this type of test.

Figure 3:
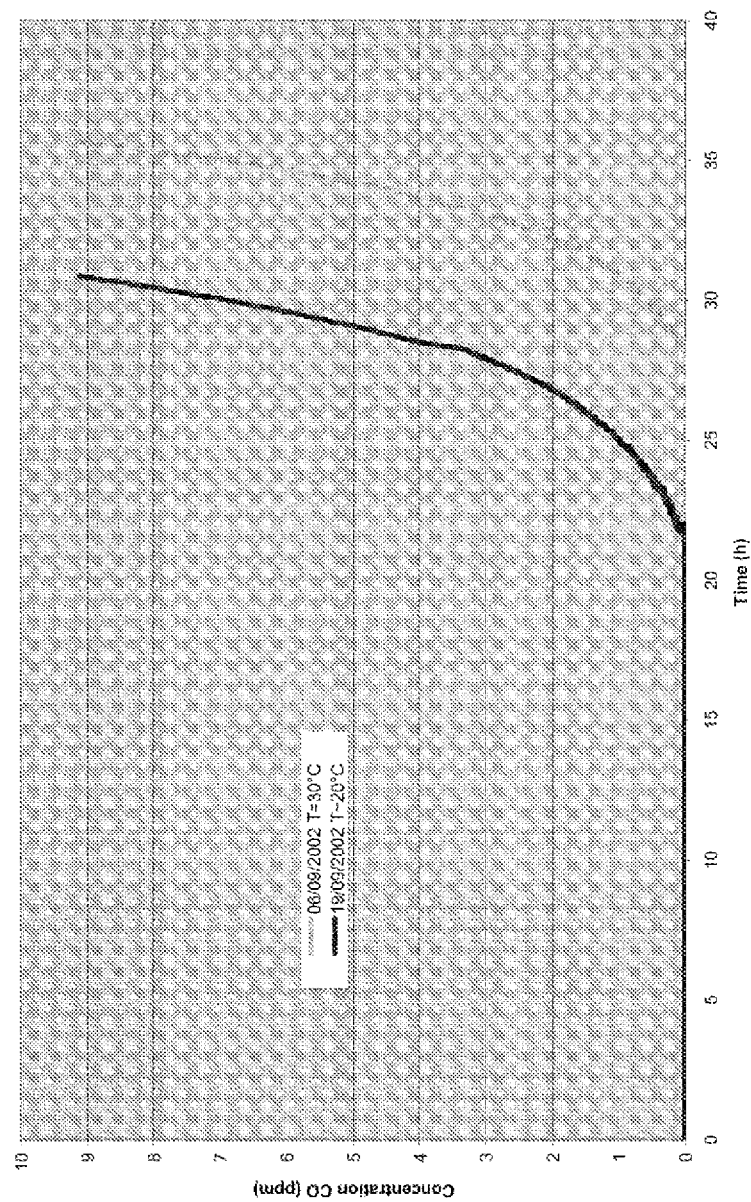
FIG. 3 illustrates the results of breakthrough of the CO through a TSA with different parametric conditions in accordance with one embodiment of the present invention.

FIG. 3 also presents results of breakthrough of the CO through a TSA with different parametric conditions, showing the impact of the operating temperature. A temperature gradient of 10° C. significantly changes the capture capacity of the chemisorbant.

This observation is important for the scaling of a TSA; the data taken at low temperatures will make possible TSA designs which are conservative, thus without risk, given that the ambient temperature (thus the operating temperature) will increase.

This ultrapurification brought about by the TSA is possible by means of a material, for example, based on Ni, indeed even on Cu.

The adsorption capacity of Ni or of Cu for CO is very dependent on the operating conditions.

Regeneration conditions (low pressure, that is to say of the order of or less than 1.5 bar, and temperature greater than 150° C.) have been defined in order to use the adsorbent in TSA and the repeatability has been confirmed. Depending on the operating conditions and the design, the TSA may, for example, be regenerated only once a month.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A process for the production of a hydrogen gas stream comprising a CO content of less than 1 ppm derived from synthesis gas feed gas, the method comprising a production cycle comprising two phases:
    a first phase comprising the following successive steps:
    a) purifying a synthesis gas feed by adsorption in a PSA unit,
    b) recovering, at the outlet of the PSA unit a hydrogen gas stream comprising a CO content of greater than 1 ppm,
    c) purifying the gas stream recovered in step b) by adsorption in a TSA unit, and
    d) recovery at the outlet of the TSA unit a hydrogen gas stream comprising a CO content of less than 1 ppm, and
    a second phase comprising the following successive steps:
    e) purifying the synthesis gas by adsorption in the PSA unit,
    f) recovering at the outlet of the PSA unit a hydrogen gas stream comprising a CO content of less than 1 ppm, wherein, throughout steps e) and f), the TSA unit is bypassed by the hydrogen gas stream and is regenerated.

2. The process as claimed in claim 1, wherein, during the second phase, the TSA unit is bypassed by means of a bypass line.

3. The process as claimed in claim 1, wherein the TSA unit comprises a single adsorber.

4. The process as claimed in claim 3, wherein the single adsorber comprises an active material which will chemisorb at least a part of the CO.

5. The process as claimed in claim 4, wherein the active material comprises nickel and/or copper.

6. The process as claimed in claim 1, wherein the PSA unit comprises at least two adsorbers which each follow, in staggered fashion during the first phase, a pressure cycle comprising adsorption, depressurization and repressurization stages.

7. The process as claimed in claim 6, wherein a pressure cycle carried out during the second phase exhibits a shorter duration than the duration of the pressure cycle carried out during the first phase.

8. The process as claimed in claim 6, wherein:
    the pressure cycle during the first phase and a pressure cycle during the second phase exhibit an identical duration and
    a depressurization of the pressure cycle carried out during the second phase is carried out at a lower pressure than the pressure of the depressurization carried out during the first phase.

9. The process as claimed in claim 1, wherein the PSA unit comprises at least one adsorber comprising a layer of alumina, a layer of activated carbon and a layer of molecular sieve.

10. The process as claimed in claim 1, wherein the duration of the first phase is greater than 10 times the duration of the second phase.

* * * * *